United States Patent [19]

Morelock

[11] 4,385,020
[45] May 24, 1983

[54] METHOD FOR MAKING SHAPED SILICON-SILICON CARBIDE REFRACTORIES

[75] Inventor: Charles R. Morelock, Ballston Spa, N.Y.

[73] Assignee: General Electric Company, Schenectady, N.Y.

[21] Appl. No.: 338,827

[22] Filed: Jan. 11, 1982

Related U.S. Application Data

[63] Continuation of Ser. No. 134,704, Mar. 27, 1980, abandoned.

[51] Int. Cl.³ ................... C04B 35/64; C04B 35/60
[52] U.S. Cl. .................................. 264/62; 264/63; 264/109
[58] Field of Search .............. 264/56, 57, 58, 63, 264/65, 109, 62, 60, 257

[56] References Cited

U.S. PATENT DOCUMENTS

| | | | |
|---|---|---|---|
| 2,039,172 | 4/1936 | Lemmerman | 264/57 |
| 2,842,500 | 7/1958 | Gibson et al. | 264/63 |
| 2,938,807 | 5/1960 | Anderson | 264/63 |
| 2,974,388 | 3/1961 | Ault | 264/57 |
| 3,090,691 | 5/1963 | Weyer | 264/63 |
| 3,534,131 | 10/1970 | Gebler et al. | 264/57 |
| 3,725,015 | 4/1973 | Lynch | 264/60 |
| 3,958,924 | 5/1976 | Egenolf et al. | 264/57 |
| 3,966,855 | 6/1976 | Hollenberg et al. | 264/65 |
| 4,019,913 | 4/1977 | Weaver et al. | 106/73.5 |
| 4,120,731 | 10/1978 | Hillig et al. | 106/44 |
| 4,150,998 | 4/1979 | Morelock | 106/44 |
| 4,154,787 | 5/1979 | Brown | 106/44 |
| 4,174,950 | 11/1979 | Jalbert | 264/57 |
| 4,238,433 | 12/1980 | Hillig et al. | 264/60 |
| 4,240,835 | 12/1980 | Laskow et al. | 106/44 |
| 4,332,753 | 6/1982 | Crooke et al. | 264/57 |

*Primary Examiner*—Willard E. Hoag
*Attorney, Agent, or Firm*—William A. Teoli; James C. Davis, Jr.; James Magee

[57] ABSTRACT

Certain silicon-carbide shaped refractories can be obtained at molten silicon infiltration temperatures in a pollution-free manner by using an organic binder-free putty-like material of silicon powder, particulated carbon, including carbon fiber, and water, and optionally silicon carbide powder.

4 Claims, No Drawings

METHOD FOR MAKING SHAPED SILICON-SILICON CARBIDE REFRACTORIES

This application is a continuation of application Ser. No. 134,704, filed Mar. 27, 1980, and now abandoned.

CROSS REFERENCE TO RELATED APPLICATIONS

Reference is made to copending application Ser. No. 969,946, filed Dec. 15, 1978, Hillig et al, now U.S. Pat. No. 4,238,433 for A Method of Making Molten Silicon Infiltration Reaction Products and Products Made Thereby and Ser. No. 100,579, filed Dec. 5, 1979 of Laskow et al, now U.S. Pat. No. 4,240,835 for Method of Making a Shaped Silicon Carbide-Silicon Matrix Composite and Articles Made Thereby, where both applications are assigned to the same assignee as the present invention.

BACKGROUND OF THE INVENTION

Prior to the present invention, silicon-silicon carbide composites made to a specific shape were made in accordance with the procedure shown in Laskow et al, U.S. Pat. No. 4,141,948, assigned to the same assignee as the present invention, where molten silicon was allowed to infiltrate into a mold containing a carbon fiber preform. The carbon fiber preform of Laskow et al was generally made by use of an organic binder which could be baked out of the preform prior to molten silicon infiltration or which could be allowed to react during the silicon carbide formation, resulting in the production of organic gases which had to be removed from the furnace during the composite formation. Another procedure is shown by Weaver, U.S. Pat. No. 3,725,015 which involves the production of cold forming a carbon fiber preform using an organic binder prior to the reaction of the preform with a metal to produce a metal carbide. Those skilled in the art know that the presence of organic binders often result in air pollution and contaminate the atmosphere or the equipment used in making the shaped metal carbide part.

The present invention is based on the discovery that shaped silicon-silicon carbide refractories do not have to be made by the use of a carbon fiber preform or by the employment of an organic binder prior to molten silicon infiltration by using a putty-like mixture of powdered silicon, particulated carbon, water and optionally silicon carbide powder. The putty can be applied onto the surface of a silicon carbide refractory supporting base structure, or a material having an expansion coefficient similar to silicon carbide, such as about $5.5 \times 10^{-6}$ per degree C., contoured to provide the final shape desired in the refractory part. After it has dried, the putty remains self-supporting. The total composite of the silicon carbide part and applied putty can then be placed in a furnace and heated to molten silicon infiltration temperatures to produce a shaped silicon-silicon carbide refractory.

STATEMENT OF THE INVENTION

There is provided by the present invention a method for making a shaped silicon-silicon carbide refractory which comprises (1) forming a putty by blending a mixture of
 (a) 100 parts of silicon powder,
 (b) 5 to 50 parts of particulated carbon
 (c) 0 to 600 parts of silicon carbide and
 (d) 4 to 15 parts of water,
where (a) and (c) have an average particle size of 1 to 200 microns and (b) is a carbon particle or fiber having a diameter of 8 to 12 microns and an aspect ratio of L/D of from 2 to 8, (2) applying the putty of (1) onto the surface of a shaped structure having an expansion coefficient about equivalent to silicon carbide, or allows lateral expansion of in situ formed silicon-silicon carbide refractory.

(3) heating the resulting putty silicon carbide composite of (2) to a temperature of 1410° C. to 1600° C. to convert the applied putty to a shaped silicon-silicon carbide refractory, and (4) allowing the resulting composite of (3) to cool to ambient temperature and separating the resulting silicon-silicon carbide refractory from the supporting refractory structure.

As used hereinafter, the term carbon fiber or filaments includes commercially available carbon fiber as previously defined. The carbon fiber includes, for example, "high strength" graphite having a tensile psi of typically $10^5$ psi, a modulus of $20 \times 10^6$ psi and a carbonized density of 1.6 g/cc as shown by Johnson et al, U.S. Pat. No. 3,412,062. Preferably the carbon fiber has a specific gravity of about 1.3 to 1.5 and includes, for example, WYK braid, WYB tow of Union Carbide Corp. and other carbonized fibers derived from rayon or regenerated cellulose fibers such as carbon felt. In addition to carbonized rayon fibers and carbon fibers having a specific gravity as defined above derived from other polymeric materials such as polyacrylonitrile, polyacetylene, such as shown by Krutchen U.S. Pat. No. 3,852,235 assigned to the same assignee as the present invention, polyvinyl chloride, polyvinyl acetate, etc., can be employed. The term "preform", as used hereinafter, is preferably a shaped structure of oriented carbon fibers such as a prepreg. To form a preform, a carbon fiber tow, braid or cloth is treated with molten wax or other binder such as cellulose nitrate, colloidal graphite, etc.

In the practice of the invention, the powdered silicon carbon fiber putty can be made by initially mixing the various ingredients together in the desired proportions as previously defined. Depending upon the density of the resulting shaped refractory desired, the proportion of powdered silicon carbide utilized in the putty can vary widely.

In certain instances, additional powdered silicon can be added to the shaped refractory, to further modify the characteristics of the resulting shaped silicon-silicon carbide composite. It has been found desirable in instances where excess powdered silicon is used subsequent to initial molten silicon infiltration, to utilize excess carbon particulate in the initial putty blend over that amount normally necessary for silicon-carbon fiber interaction to provide sufficient working action for the additional molten silicon infiltration.

The application of the putty onto the silicon carbide substrate can be accomplished by use of a spatula, brush, etc.

It has been found useful in certain cases, particularly where the shape is circular to have a revolving base to support the silicon-carbide part to which the putty is initially applied.

If desired release agents, such as boron nitride can be applied to the surface of the silicon-carbide base structure to facilitate the release of the resulting sintered silicon-silicon carbide part.

In instances where thick section parts are made, it is preferred to allow the water to evaporate under ambient conditions before placing the array of applied putty and silicon carbide supporting structure into the furnace.

Furnace temperatures of 1410° C. to 1600° C. can be used at 1 to 10 minutes. Although no organic decomposition products are released during the heating cycle, it has been found desirable to heat the coated silicon-carbide part in a non-oxidizing atmosphere at pressures of 0.050 to 1 torr.

Those skilled in the art know in instances where the desired shaped silicon-silicon carbide shaped refractory is a disc, or other shape which allows lateral expansion of the putty, the base structure does not have to have an expansion coefficient similar to silicon carbide. It can be graphite, for example.

Among the silicon carbide refractory parts which can be made by the method of the present invention are, for example, gas turbine shroud sections, aircraft engine shroud sections, gas turbine transition pieces, diesel engine pistons and rings, heat exchange pipes, hot processing dies, combustion liners, fusion refractory hardware, wear resistant tiles, etc.

In order that those skilled in the art will be better able to practice the invention the following examples are given by way of illustration and not by way of limitation. All parts are by weight.

EXAMPLE 1

A mixture consisting of 7 parts of gray silicon carbide having an average particle size of about 175 microns, 0.7 part of crushed carbon felt having an average diameter of about 10 microns and L/D ratio of about 4 and 2.3 parts of powdered silicon having an average particle size of about 75 microns was mixed with 0.1 part of distilled water. The various ingredients were thoroughly mixed together with a spatula to produce a mixture having a putty-like consistency. The mixture was applied to a boron nitride coated silicon carbide dish with a spatula and a brush. The silicon carbide dish was 13" in diameter, and 1¾" deep with a ¼" wall thickness. The dish was inverted and placed on a revolving table. The surface of the dish was sprayed with boron nitride to a thickness of about 15 mils. When dry, it was coated with a Krylon water resistant agent, a product of the Borden Company. The putty was then applied onto the surface of the plate to a thickness of about ⅛ in a uniform manner. After the water had evaporated after 8 hours under ambient conditions, it was found that the coating had remained intact. The coated plate was then place in a vacuum furnace and heated to 1500° C. 10 minutes. After the furnace had cooled to room temperature, the coated dish was removed. It was found that the coating was rigid and was easily separated from the base structure. There was obtained a replica of the silicon carbide dish in the form of a silicon carbide refractory.

EXAMPLE 2

An 11¼ inch×⅛ inch disc was molded from the putty of Example 1 on a 14 inch×½ inch boron nitride coated graphite substrate. The disc was allowed to dry for 8 hours under atmospheric conditions.

There was spread 250 grams of granular 8 mesh silicon onto the surface of the disc. The assembly was then placed in a furnace and heated to 1550° C. for 30 minutes at 0.1 torr. The assembly was then removed from the furnace and allowed to cool to ambient temperatures. There was obtained an 11¼×8 inch silicon-silicon carbide disc having the same dimensions as the original putty structure and substantially free of surface imperfections.

Although the above examples are directed to only a few of the very many variables which can be employed in the practice of the method of the present invention, it should be understood that the present invention is directed to the use of a much broader variety of particulated carbon including carbon fiber and blends of such particulated carbon with the other ingredients such as silicon carbide, silicon powder and water utilized in making the putty of the present invention. In addition, supporting substrates which can be utilized to provide the various shapes onto which the putty is applied, include in addition to silicon carbide, graphite, etc., any material capable of resisting changes in shape under silicon infiltration conditions and which does not cause any stress in the applied putty structure due to changes in coefficient of expansion or lateral expansion of the resulting silicon-silicon carbide shaped refractory. Further, the putty can be fabricated in certain instances to specific shapes, for example, a rod or ring having a diameter of up to 2 inches which can rest on an appropriate supporting substrate allowing lateral expansion to form a refractory within and changing in shape at silicon infiltration temperatures.

What I claim as new and desire to secure by Letters Patent of the United States is:

1. A method for making a shaped silicon-silicon carbide refractory which consists essentially of
   (1) forming a putty by blending a mixture of
      (a) 100 parts of silicon powder,
      (b) 5 to 50 parts of particulated carbon,
      (c) 0 to 600 parts of silicon carbide, and
      (d) 4 to 15 parts of water,
      where said mixture is free of binder other than water, (a) and (b) have an average particle size of 1 to 200 microns, and (b) are carbon particles or fiber having a diameter of about 8 to 12 microns and an aspect ratio of L/D of from 2 to 8,
   (2) applying the putty of (1) onto the surface of a shaped supporting structure which has an expansion coefficient about equivalent to silicon carbide, or allows lateral expansion of in situ formed silicon-silicon carbide refractory,
   (3) heating the resulting applied putty-silicon carbide composition of (2) to a temperature of 1410° C. to 1600° C. to convert the applied putty to a shaped silicon-silicon carbide refractory, and
   (4) allowing the resulting composite of (3) to cool to ambient temperature and separating the resulting silicon-silicon carbide refractory from the supporting refractory structure.

2. A method in accordance with claim 1, where additional powdered silicon is placed in contact with the silicon-silicon carbide refractory and the total is heated at molten silicon infiltration temperatures to produce a refractory having a higher weight percent of infiltrated silicon.

3. A method in accordance with claim 1, where the particulated carbon in the putty is in the form of carbon fiber.

4. A method in accordance with claim 1, where the putty is applied onto the surface of the substrate in the form of a disc.

* * * * *